United States Patent
Cho et al.

(10) Patent No.: US 7,524,475 B2
(45) Date of Patent: Apr. 28, 2009

(54) CERIUM OXIDE POWDER FOR ONE-COMPONENT CMP SLURRY, PREPARATION METHOD THEREOF, ONE-COMPONENT CMP SLURRY COMPOSITION COMPRISING THE SAME, AND METHOD OF SHALLOW TRENCH ISOLATION USING THE SLURRY

(75) Inventors: Seung Beom Cho, Daejeon (KR); Jun Seok Nho, Daejeon (KR); Dong Mok Shin, Daejeon (KR); Jong Pil Kim, Daejeon (KR); Myoung Hwan Oh, Daejeon (KR); Jang Yul Kim, Daejeon (KR); Eun Mi Choi, Seongnam-si (KR); Min Jin Ko, Daejeon (KR)

(73) Assignee: LG Chem, Ltd., Seoul (KR)

( * ) Notice: Subject to any disclaimer, the term of this patent is extended or adjusted under 35 U.S.C. 154(b) by 299 days.

(21) Appl. No.: 11/514,309

(22) Filed: Sep. 1, 2006

(65) Prior Publication Data

US 2007/0081931 A1 Apr. 12, 2007

(30) Foreign Application Priority Data

Sep. 2, 2005 (KR) .................. 10-2005-0081734
Oct. 14, 2005 (KR) .................. 10-2005-0097157

(51) Int. Cl.
*B01J 23/10* (2006.01)
*B22F 9/00* (2006.01)
*B24B 1/00* (2006.01)
*C01F 17/00* (2006.01)
*C09G 1/02* (2006.01)

(52) U.S. Cl. .................. 423/263; 423/266; 502/302; 502/304; 438/692; 438/693; 51/293; 51/296; 51/307; 51/309; 419/45; 419/53; 419/54; 419/55

(58) Field of Classification Search .............. 42/263, 42/266; 502/302, 304; 438/692, 693; 51/293, 51/296, 306, 307; 419/45, 53, 54, 55

See application file for complete search history.

(56) References Cited

U.S. PATENT DOCUMENTS

| 6,420,269 | B2 * | 7/2002 | Matsuzawa et al. | 438/693 |
|---|---|---|---|---|
| 6,615,499 | B1 * | 9/2003 | Matsuzawa et al. | 51/309 |
| 2005/0198912 | A1 * | 9/2005 | Kim et al. | 51/307 |
| 2006/0032147 | A1 * | 2/2006 | So et al. | 51/307 |

* cited by examiner

*Primary Examiner*—Timothy C Vanoy
*Assistant Examiner*—Serena L Hanor
(74) *Attorney, Agent, or Firm*—McKenna Long & Aldridge, LLP

(57) ABSTRACT

A cerium oxide powder for one-component CMP slurry, which has a specific surface area of 5 m$^2$/g or more, and a ratio of volume fraction of pores with a diameter of 3 nm or more to that of pores with a diameter less than 3 nm of 8:2~2:8, is disclosed. A method for preparing the same, a one-component CMP slurry comprising the same as an abrasive material, and a method of shallow trench isolation using the one-component CMP slurry are also disclosed. The CMP slurry causes no precipitation of the cerium oxide powder even if it is provided as a one-component CMP slurry, because the CMP slurry uses, as an abrasive material, cerium oxide powder that is obtained via a low-temperature calcination step, optionally a pulverization step, and a high-temperature calcination step and has a high pore fraction and low strength.

22 Claims, 2 Drawing Sheets ic and abrasives. Recently, cerium oxide has come into the spotlight as an inorganic abrasive material essential to form advanced CMP (chemical mechanical polishing) slurry for use in a shallow trench isolation process in the field of semiconductor devices.

CERIUM OXIDE POWDER FOR ONE-COMPONENT CMP SLURRY, PREPARATION METHOD THEREOF, ONE-COMPONENT CMP SLURRY COMPOSITION COMPRISING THE SAME, AND METHOD OF SHALLOW TRENCH ISOLATION USING THE SLURRY

This application claims the benefit of Korean Patent Application Nos. 10-2005-0081734 and 10-2005-0097157, filed Sep. 2, 2005 and Oct. 14, 2005, respectively in Korea, which are hereby incorporated by reference in their entirety for all purposes as if fully set forth herein.

TECHNICAL FIELD

The present invention relates to cerium oxide powder for one-component CMP (chemical mechanical polishing) slurry, a method for preparing the same, a one-component CMP slurry comprising the same, and a method of shallow trench isolation using the same slurry. More particularly, the present invention relates to cerium oxide powder, which is prepared via a low-temperature calcination step, a pulverization step and a high temperature calcination step and has a high pore fraction and low strength, and to a one-component CMP slurry, which comprises the cerium oxide powder as an abrasive material and has a high selective polishing rate ratio of silicon oxide layer/silicon nitride layer, and thus shows an excellent polishing rate and selectivity even in the absence of additional additives or an excessive amount of dispersant.

BACKGROUND ART

In general, cerium oxide is a highly functional ceramic material that is widely used in catalysts, phosphors, cosmetics and abrasives. Recently, cerium oxide has come into the spotlight as an inorganic abrasive material essential to form advanced CMP (chemical mechanical polishing) slurry for use in a shallow trench isolation process in the field of semiconductor devices.

Important characteristics of CMP slurry for STI CMP processes include a polishing rate to a silicon oxide ($SiO_2$) layer, polishing selectivity between a silicon oxide layer and a silicon nitride ($Si_3N_4$) layer, and an anti-scratching property to a surface to be polished. To provide slurry having such important characteristics, it is required to control the particle size, shape, oxidation behavior, crystallinity, strength, etc. of cerium oxide powder used as an abrasive material. Cerium oxide-based slurry shows lower dishing and erosion as compared to conventional silica-based slurry, and has high polishing selectivity between a silicon oxide layer and a silicon nitride layer. Thus, there has been a tendency to substitute silica-based slurry with cerium oxide-based slurry in various CMP processes.

Although cerium oxide has a lower strength than the strength of a silicon oxide layer and a silicon nitride layer to be polished, it still can be used as an abrasive material. This is because polishing of a silicon oxide layer is made not only by a mechanical polishing action but also by a chemical reaction caused by cerium oxide. This is supported by a recent report on chemical reactions of cerium oxide (Journal of Non-Crystalline Solids, 283 (2001) pp. 129-136).

Meanwhile, conventional polishing slurry has required additives in addition to the polishing slurry in order to increase the selective polishing rate ratio (referred to also as 'selectivity' hereinafter) of silicon oxide layer/silicon nitride layer to a level of 20:1 or higher. Such additives mainly comprise an excessive amount of polycarboxylic acid-based anionic polymers. However, addition of such additives has a problem in that the additives deteriorate dispersibility of abrasive particles when they are mixed with the polishing slurry, so that the abrasive particles precipitates severely and has a non-uniform concentration in the slurry. In brief, conventional polishing slurry containing additives shows non-uniform polishing characteristics. The aforementioned problem has been solved to date by providing polishing slurry essential to perform polishing and additive slurry for realizing a high selectivity, separately (i.e. providing a two-component composition), and by mixing the two kinds of slurries right before carrying out polishing.

In another way, one-component cerium oxide-based polishing slurry has also been suggested despite the aforementioned severe precipitation phenomenon, the one-component polishing slurry being obtained by preliminarily mixing additives for realizing a high selectivity with the cerium oxide-based polishing slurry. However, in this case, it is not possible to obtain uniform polishing characteristics due to the aforementioned severe precipitation phenomenon.

DISCLOSURE OF THE INVENTION

Therefore, the present invention has been made in view of the above-mentioned problems. The inventors of the present invention have conducted many studies and have found that cerium oxide powder obtained via a low-temperature calcination step, optionally an pulverization step, and a high temperature calcination step can have a high pore fraction and low strength, and thus increases the selective polishing rate ratio of silicon oxide layer/silicon nitride layer when it is used in a CMP slurry as an abrasive material, so it can provide a one-component CMP slurry having an excellent polishing rate and selectivity even in the absence of additional additives such as polycarboxylic acid-based anionic polymers, or an excessive amount of dispersant.

Therefore, it is an object of the present invention to provide cerium oxide powder for one-component CMP slurry, which has a high pore fraction and low strength, a method for preparing the same, a one-component CMP slurry comprising the same as an abrasive material, and a method of shallow trench isolation using the one-component CMP slurry.

According to an aspect of the present invention, there is provided cerium oxide powder for one-component CMP slurry, which has a specific surface area of 5 $m^2$/g or more, and a ratio of volume fraction of pores with a diameter of 3 nm or more to that of pores with a diameter less than 3 nm of 8:2~2:8.

According to another aspect of the present invention, there is provided a method for preparing the above cerium oxide powder, the method comprising the steps of: (a) carrying out low-temperature calcination of cerium carbonate as a starting material at a temperature of 200~400° C. for 6~100 hours; and (b) carrying out high-temperature calcination of the product obtained from the preceding step at a temperature of 600~1200° C. for 30 minutes~6 hours.

According to still another aspect of the present invention, there is provided a one-component CMP slurry comprising an abrasive, a dispersant and water, wherein the abrasive comprises the aforementioned cerium oxide powder.

According to yet another aspect of the present invention, there is provided a method of shallow trench isolation (STI) characterized by using the aforementioned one-component CMP slurry.

Hereinafter, the present invention will be explained in more detail.

Generally, in a mechanical polishing process for a silicon oxide layer, it has been recognized that polishing of a silicon oxide layer is accomplished by repeating a series of steps including hydration of the surface of a silicon oxide layer (—Si(OH)$_3$), mechanical removal of the hydrated layer caused by an abrasive material, and dispersion and dissolution of the removed silicon hydrate (Si(OH)$_4$) in a solution. Similarly, it has been thought that polishing based on cerium oxide is performed by such mechanical polishing as a main polishing mechanism. However, it is disclosed in a known thesis (Journal of Non-Crystalline Solids, 283 (2001) pp 129-136) that when cerium oxide is used as an abrasive material, polishing of a silicon oxide layer is accomplished by a mechanism wherein Si—O—Ce chemical bonding occurs due to the high reactivity between cerium oxide and silicon oxide, and cerium oxide removes silicon oxide lumps from the surface of the silicon oxide layer in such a manner that the silicon oxide lumps are torn off. Such a mechanism is different from the mechanical polishing mechanism wherein only a hydrated layer forming on the surface is removed.

Unlike the aforementioned polishing action of a silicon oxide layer, a silicon nitride layer has a strength and a hardness which are higher than those of a silicon oxide layer by about three times, and polishing of a silicon nitride layer is mainly accomplished by mechanical polishing rather than polishing by chemical bonding with cerium oxide. Hence, a silicon oxide layer may show a polishing rate variable depending on chemical properties of a cerium oxide abrasive material in addition to mechanical polishing properties, such as mechanical strength of cerium oxide abrasive particles. On the other hand, a silicon nitride layer shows a polishing rate variable depending on the hardness and size of cerium oxide abrasive particles.

Meanwhile, one-component polishing slurry that may be used in a CMP process requires neither separate additives nor a separate mixing system to save the overall cost, and has easy handling properties. Also, the one-component polishing slurry contains little or no additives for providing high selectivity, which may cause agglomeration of abrasive powder, and thus decreases scratching of a layer to be polished.

In order to provide a one-component CMP slurry having such advantages, it is necessary to solve the problem related to dispersibility of cerium oxide powder used as an abrasive material. For this, it is preferable that the additives for improving polishing selectivity are not added to the slurry or a decreased amount of additives is used, because the additives may cause agglomeration of abrasive powder. However, in this case, it is not possible to obtain a desirably high selectivity. On the contrary, according to the present invention, a high selectivity can be obtained with no need for such additives by using cerium oxide powder having a high pore fraction and low strength as an abrasive material.

In other words, cerium oxide powder obtained via a low-temperature calcination step, optionally a pulverization step, and a high-temperature calcination step may have a high pore fraction and low strength. Therefore, when the cerium oxide powder is used in polishing a silicon nitride layer with high strength, the backbone structure forming the pores of the cerium oxide powder is broken with ease to provide smaller particles, resulting in a significant drop in polishing rate to a silicon nitride layer. On the other hand, since a silicon oxide layer is amenable to both mechanical polishing and chemical polishing, a significant drop in the polishing rate to a silicon oxide layer cannot be observed and a high polishing rate to a silicon oxide layer can be maintained. As a result, the one-component CMP slurry comprising the cerium oxide powder according to the present invention as an abrasive material can provide high selectivity and polishing rate even in the absence of additives for improving selectivity. Additionally, since the cerium oxide powder can be broken with ease due to its low strength, it is possible to solve the aforementioned problem of microscratch on a surface that may occur by coarse particles.

The cerium oxide powder for CMP slurry according to the present invention has a specific surface area of 5 m$^2$/g or more, and a ratio of volume fraction of pores with a diameter of 3 nm or more to that of pores with a diameter less than 3 nm of 8:2~2:8. The above pore distribution, pore fraction and specific surface area are measured by the BET method. The cerium oxide powder satisfying the above conditions of pore distribution, pore fraction and specific surface area can be broken more easily by external pressure as compared to cerium oxide powder in a bulk state, and thus can provide a decreased polishing rate to a silicon nitride layer.

The cerium oxide powder according to the present invention may have a crystallite size of 10~60 nm. If the crystallite size is less than 10 nm, polishing rate is lowered. On the other hand, if the crystallite size is greater than 60 nm, a surface polished by the cerium oxide powder may be scratched severely. The crystallite size is calculated according to the Scherrer Equation after measuring the half width of a main peak of cerium oxide with an X-ray diffraction system.

Generally, ceramic powder has a smaller specific surface area and higher powder strength as heat treatment temperature increases. Hence, ceramic powder treated under high temperature can provide an increased polishing rate but generate a great amount of scratches after polishing, when being used as an abrasive material for CMP. Unlike this, although the cerium oxide powder according to the present invention has been subjected to heat treatment under high temperature, the cerium oxide powder has a large specific surface area and maintains pores with a diameter of 3 nm or more to a high degree, and thus can decrease surface scratch. Additionally, particles of the cerium oxide powder according to the present invention have excellent crystallinity, and thus provide an excellent polishing rate.

For example, even if the same cerium oxide powder is heat treated at the same temperature, the cerium oxide powder heat treated at 800° C. according to a conventional method may have a crystallite size of 40 nm and a specific surface area of 20 m$^2$/g, while the cerium oxide powder heat treated at 800° C. after being subjected to a low-temperature calcination and pulverization step according to the present invention may have a crystallite size of 39 nm and a specific surface area of 28 m$^2$/g. In other words, the cerium oxide powder according to the present invention has crystallinity similar to that of cerium oxide powder heat treated according to the conventional method, while having a larger specific surface area, and including a greater amount of micropores with a diameter of 3 nm or more. The above data are not obtained experimentally but described optionally for illustration, so that the data are variable.

Generally, it is thought that polishing rate relates with crystallinity of an abrasive material. Thus, the cerium oxide powder according to the present invention can maintain an excellent polishing rate and provide high selectivity, while not causing surface scratch.

Meanwhile, although the above-described cerium oxide powder according to the present invention is mainly applied to CMP, applications of the cerium oxide powder are not limited thereto. The cerium oxide powder according to the present invention may be applied to other fields requiring high polishing selectivity and elimination of microscratch as an abrasive material.

Therefore, the cerium oxide powder for an abrasive material according to the present invention may have a lower powder strength as compared to conventional cerium oxide powder for an abrasive material. This may result in an increase in pore volume as measured by the BET method, because the abrasive particles are broken and closed pores of the particles are converted into open pores after polishing. That is, after polishing a silicon oxide ($SiO_2$) layer deposited on a Si substrate under a pressure of 100~400 g/cm$^3$ at a rotation speed of 50~150 rpm, fraction of pores with a diameter of 3 nm or more may increase by 5 vol %~70 vol % as compared to the pore volume fraction before polishing. Based on this, it is possible to indirectly calculate the strength of the cerium oxide powder according to the present invention.

When a silicon nitride ($Si_3N_4$) layer, used as a stop layer in a STI process, is polished with the cerium oxide powder for a predetermined time, strength of the cerium oxide powder can be measured indirectly by using a depth of a polished layer. For example, cerium oxide powder obtained by a conventional firing process may show a polishing rate of 150 Å/min, while the cerium oxide powder obtained via a low-temperature calcination step and a pulverization step according to the present invention may show a polishing rate of 75 Å/min. This indicates that the cerium oxide powder according to the present invention has a lower powder strength as compared to conventional cerium oxide powder. Therefore, according to a preferred embodiment of the present invention, the cerium oxide powder may provide a polishing rate to a silicon nitride ($Si_3N_4$) layer ranging from 20 Å/min to 300 Å/min, when it is applied to a polishing process of a silicon nitride layer deposited on a Si substrate under a pressure of 100~400 g/cm$^3$ at a rotation speed of 50~150 rpm.

Therefore, the cerium oxide powder having such a low strength according to the present invention can be used as an abrasive material for one-component CMP slurry, particularly as an abrasive material for one-component CMP slurry having a polishing selectivity of silicon oxide layer/silicon nitride layer of at least 20:1.

Meanwhile, the cerium oxide powder according to the present invention may have an average particle diameter of 50 nm~1 μm and the largest particle size less than 3 μm. Such particle distribution may be a particle size distribution obtained in a dry state after firing. Otherwise, considering the use of the cerium oxide power as an abrasive material for CMP slurry, such particle distribution may be a particle size distribution obtained by dispersing the powder in a slurry and subjecting the resultant slurry to a conventional wet dispersion process using a ball mill, an attrition mill, or the like.

The cerium oxide powder according to the present invention may be prepared by a method comprising the steps of: (a) carrying out low-temperature calcination of cerium carbonate as a starting material at a temperature of 200~400° C.; and (b) carrying out high-temperature calcination of the product obtained from the preceding step at a temperature of 600~1200° C.

Optionally, the method may further comprise a step of pulverizing the calcined cerium oxide powder, after step (a).

It is possible to obtain cerium oxide powder having a high pore fraction and low strength by carrying out a low-temperature calcination step, and optionally a pulverization step, as described above. In a variant, a pore-forming material may be further added to enhance formation of pores, as described hereinafter. However, heat treatment of cerium carbonate during the low-temperature calcination step allows decomposition of cerium carbonate, vaporization of $CO_2$, and formation of cerium oxide, even if such pore-forming materials are not added. At this time, $CO_2$ may function as a pore forming agent. Additionally, when calcined cerium oxide is pulverized and dispersed so as to have a smaller particle size, and then is fired, such smaller particles may be fired in an agglomerate state, thereby forming particles having many pores. Further, it is possible to control pore volume and pore distribution by controlling low-temp. calcination temperature, pulverization conditions, high-temperature calcination temperature, or the like. During the low-temperature calcination step, calcination may be performed at a temperature, where cerium carbonate starts to be oxidized into cerium oxide, for a long period of time. In this manner, pores can be prevented from being closed during the oxidation of cerium carbonate due to a rapid increase in temperature. Thus, it is possible to increase the fraction of pores with a diameter of 3 nm.

Step (a) is for forming cerium oxide by the calcination of cerium carbonate as a starting material. low-temperature calcination may be performed by way of heat treatment under an oxidative atmosphere at a temperature of 200~400° C., wherein a heat treatment time of 6~100 hours is preferred.

The starting material, cerium carbonate may be one currently used for the preparation of cerium oxide, and cerium carbonate having an average particle diameter of 0.1~20 μm is particularly preferred. If the cerium carbonate has an average particle diameter less than 0.1 μm, cerium oxide powder finally formed from the above method has an average particle diameter less than 50 nm, resulting in a significant drop in polishing rate. On the other hand, if the cerium carbonate has an average particle diameter greater than 20 μm, a long period of pulverization time is required and cerium oxide powder having a broad particle size distribution is obtained.

The low-temperature calcination step may be carried out under an oxidative atmosphere in a conventional heating system such as box type heating furnace, automatic conveyer type continuous furnace, or a rotary continuous furnace.

If the low-temperature calcination step is carried out at a temperature less than 200° C., a complete phase transition from cerium carbonate into cerium oxide cannot be accomplished. On the other hand, if the low-temperature calcination step is carried out at a temperature higher than 400° C., the resultant abrasive powder has an increased size of primary particles or an increased strength of abrasive particles, resulting in an increase in polishing rate of a silicon nitride layer (drop in polishing selectivity) and generation of microscratch on a surface to be polished.

Meanwhile, the starting material, cerium carbonate, may further comprise a material capable of forming pores of cerium oxide during the preparation thereof.

In other words, the pore-forming material is bound to cerium carbonate during the preparation thereof (particularly, in the case of a wet process for preparing cerium carbonate) by way of adsorption to crystal surfaces of cerium carbonate and pore formation. Also, the pore-forming material evaporates easily by heating and can form pores in cerium oxide upon the conversion of cerium carbonate into cerium oxide in the low-temperature calcination step. Such pore-forming materials include organic molecules, organic polymers or organic solvents.

Formation of micropores in cerium oxide powder, caused by the pore-forming materials, follows the mechanism as described hereinafter. Since cerium carbonate is polycrystal powder, nuclei of particles are generated during the preparation of the cerium carbonate powder, and ions of a pore-forming material adsorb on surfaces of the nuclei. When the nuclei grow into particle, they generate internuclear agglomeration. Therefore, the particles are in a state wherein the ions are adsorbed on interfaces of small grains. Because such ions may be vaporized easily by heating, no ions remain after a high-temperature calcinations step, and pores are formed in the spaces from which the ions are removed.

Although there is no particular limitation in the kind of the organic molecule or organic polymer, organic molecules or organic polymers capable of being thermally decomposed at a temperature of 450° C. or less are particularly preferred. Organic solvents that evaporate at a temperature of 300° C. or less and have a dielectric constant of 10~80 are also preferred.

Non-limited examples of the pore-forming material include aliphatic hydrocarbons, aromatic hydrocarbons, ether compounds, anhydride compounds, carbonate compounds, acrylic compounds, thioether compounds, isocyanate compounds, sulfone compounds, sulfate ion compounds, sulfoxide compounds, alkylene oxide polymers, acrylate polymers, methanol, ethanol, propanol, butanol, ehylene glycol, propylene glycol, acetone, glycerin, formic acid, ethyl acetate, or the like.

The pulverization step that may be optionally performed is a pretreatment step of pulverizing coarse and large particles and is performed preferably via a dry pulverization process. Non-limiting examples of such processes include processes using a jet mill, disc mill, beads mill, or the like.

The cerium oxide powder obtained from the pulverization step preferably has an average particle diameter of 0.3~2 µm.

Then, the calcined cerium oxide powder is subjected to a high-temperature calcination step at a temperature of 600~1200° C. to provide cerium oxide powder having a high pore fraction and low strength. Although the high-temperature calcination step may be performed under ambient atmosphere, it is preferable that the high-temperature calcination step is performed under an oxidative atmosphere, more preferably, at a temperature of 600~1200° C. for 30 minutes~6 hours.

If the high-temperature calcination step is performed at a temperature less than 600° C. or higher than 1200° C., polishing rate to a silicon nitride layer undesirably increases.

The one-component CMP slurry according to the present invention comprises an abrasive, a dispersant and water. Particularly, because the one-component CMP slurry according to the present invention comprises the above-described cerium oxide powder as an abrasive material, it can provide a polishing selectivity of silicon oxide layer/silicon nitride layer of 20:1 or more.

As described above, the one-component CMP slurry comprising the above-described cerium oxide powder as an abrasive material according to the present invention can realize a high selectivity of 20:1 or more, even in the absence of a separate additive for improving the polishing selectivity of silicon oxide layer/silicon nitride layer, particularly, a polycarboxylic acid-based anionic dispersant. Additionally, such high selectivity is obtained by reducing the polishing rate to a silicon nitride layer. Although there is no particular limitation in polishing rate to a silicon oxide layer in the present invention, it is preferable to maintain a polishing rate to a silicon oxide layer to a degree of 3000 Å/min or higher.

The dispersant used in the one-component CMP slurry according to the present invention serves not only to improve dispersion of the abrasive powder, i.e. cerium oxide powder, but also to control the polishing selectivity of silicon oxide layer/silicon nitride layer to a high selectivity value of 20:1 or more.

As mentioned above, one of the features of the one-component CMP slurry according to the present invention is that stable dispersibility and high selectivity can be obtained with no need for addition of an excessive amount of dispersant.

Preferably, the dispersant may be contained in the one-component CMP slurry in an amount of 0.5~10 parts by weight based on 100 parts by weight of cerium oxide powder (solid content basis). If the dispersant is used in an amount less than 0.5 parts by weight, cerium oxide powder may precipitate quickly due to a low dispersion force, so that precipitation (separation between solid and liquid) may occur during transport of the cerium oxide powder and a sufficient selectivity cannot be realized. Additionally, if the dispersant is used in an amount greater than 10 parts by weight, it is not possible to realize a sufficient selectivity due to a drop in dispersion force.

Herein, the amount of the dispersant is measured by drying cerium oxide powder at 100° C. for 24 hours, and then by observing variations in weight to 1000° C. via TGA (thermogravimetric analysis) to measure thermal loss of weight on the basis of dry powder.

As the dispersant, non-ionic polymers or anionic polymers may be used and non-limited examples thereof include non-ionic polymers such as polyvinyl alcohol (PVA), ethylene glycol (EG), glycerin, polyethylene glycol (PEG), polypropylene glycol (PPG) or polyvinyl pyrrolidone (PVP), or anionic polymers such as polyacrylic acid, ammonium polyacrylate or polyacryl maleic acid. Such dispersants may be used alone or in combination.

Preferably, the cerium oxide powder in the one-component CMP slurry according to the present invention may be used in an amount of 0.1~50 wt % based on the total weight of the slurry. If the cerium oxide powder is used in the CMP slurry in an amount less than 0.1 wt %, polishing rate to a silicon oxide layer decreases significantly. On the other hand, if the cerium oxide powder is used in an amount greater than 50 wt %, the resultant composition has too high viscosity to supply stable slurry during pulverization, dispersion and polishing steps.

The CMP slurry according to the present invention can be prepared by the method comprising the steps of: (a) mixing the above cerium oxide powder, a dispersant and water; and (b) pulverizing and dispersing the mixture.

The pulverization and dispersion step may be performed preferably by way of a wet pulverization and dispersion process capable of controlling particle size finely and precisely. Non-limiting examples of such wet processes include processes using a ball mill, an attrition mill, etc.

As described above, the cerium oxide powder dispersed in the final one-component CMP slurry obtained after the pulverization and dispersion step preferably has the largest particle size less than 3 µm, and an average particle diameter of 500 nm~1 µm.

Further, the present invention provides a method of shallow trench isolation characterized by using the above-described one-component CMP slurry. The method of shallow trench isolation may be performed according to a conventional STI process currently used in the art.

BRIEF DESCRIPTION OF THE DRAWINGS

The foregoing and other objects, features and advantages of the present invention will become more apparent from the following detailed description when taken in conjunction with the accompanying drawings in which.

BEST MODE FOR CARRYING OUT THE INVENTION

Reference will now be made in detail to the preferred embodiments of the present invention. It is to be understood that the following examples are illustrative only and the scope of the present invention is not limited thereto.

EXAMPLE 1

Figure 3:
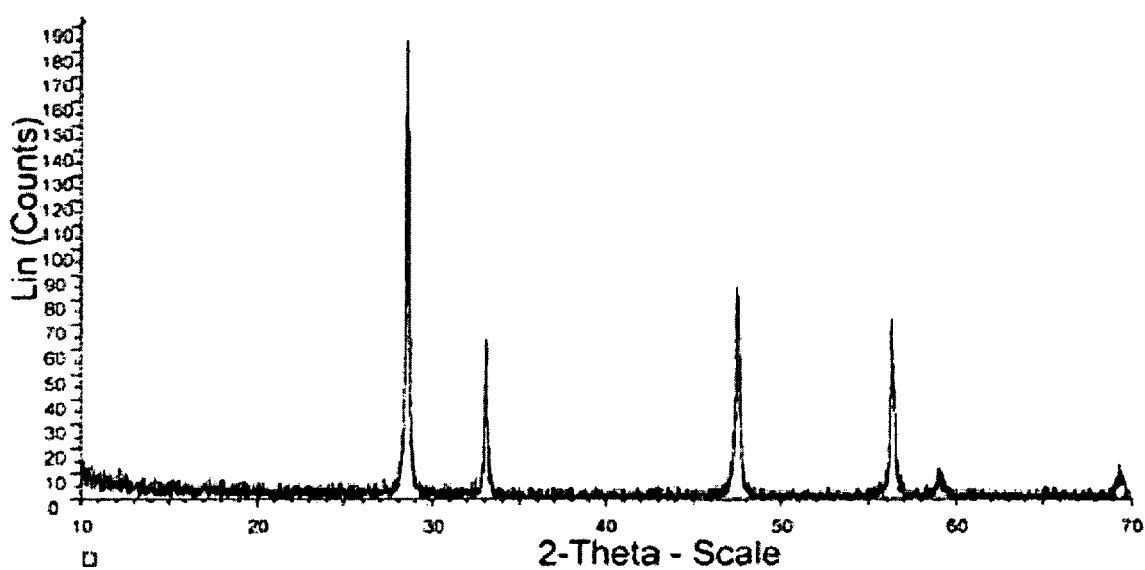
FIG. 3 illustrates data of XRD (X-ray diffraction) analysis of the cerium oxide obtained via a low-temperature calcination step, a pulverization step and a high-temperature calcination step according to a preferred embodiment of the present invention.

Cerium carbonate powder was washed with distilled water and ethanol at least three times, and dried in an oven at 100° C. for 24 hours. Next, 1 kg of the dried cerium carbonate powder was introduced into a crucible made of alumina, and calcined at 250° C. for 6 hours under an oxidative atmosphere with a sufficient amount of air supplied thereto, followed by pulverization with a jet mill. Then, the pulverized powder was fired at 700° C. for 2 hours to provide cerium oxide showing a light yellow color. As shown in FIG. 3, XRD analysis of the powder demonstrates a complete phase transition from cerium carbonate into cerium oxide.

Then, 500 g of the cerium oxide obtained as described above, 25 g of polyacrylic acid (Aldrich) as a dispersant and 5L of pure water were mixed, and aqueous ammonia was added thereto to adjust pH of the mixture to 7.5, thereby providing a dispersion of cerium oxide. To perform pulverization and dispersion of cerium oxide, the dispersion of cerium oxide was mixed with 1 kg of zirconia balls with a diameter of 1 mm. The mixture was introduced into a ball mill container made of polypropylene, and then pulverized and dispersed at 250 rpm for 2 hours to obtain dispersion slurry.

Figure 1:
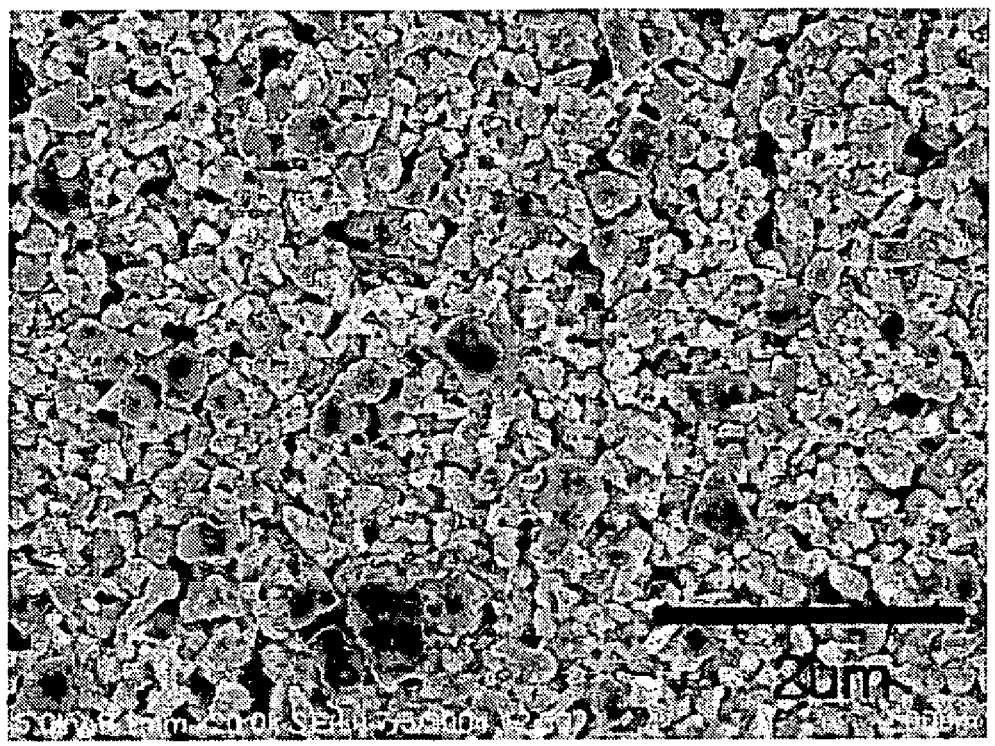
FIGS. 1 and 2 are photographic views of the CMP slurry prepared according to a preferred embodiment of the present invention, taken by SEM (scanning electron microscopy)
Figure 2:
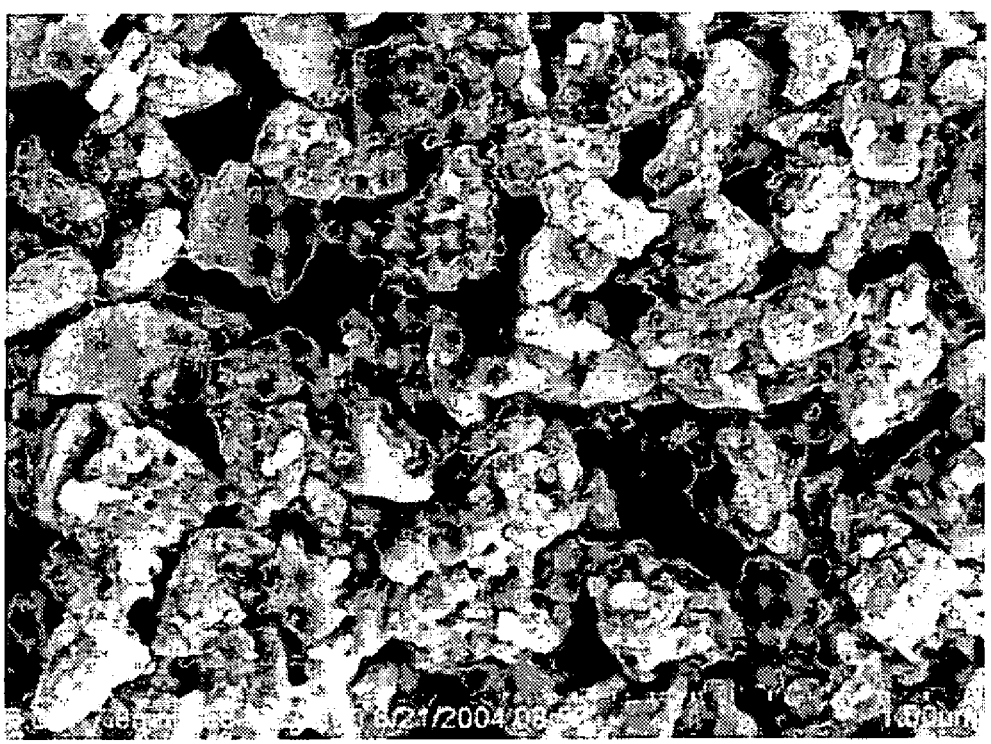

The dispersion slurry was filtered through a 1 μm filter, and distilled water was added thereto to provide a one-component CMP slurry containing 1 wt % of cerium oxide powder. FIGS. 1 and 2 are SEM photographs of the CMP slurry. Additionally, the cerium oxide powder dispersed in the CMP slurry was measured for the particle size distribution of cerium oxide powder by using a particle size distribution measuring system (Horiba LA-910). After the measurement, it is confirmed that the cerium oxide powder had a particle size distribution of about 50~300 nm and an average particle diameter of 120 nm.

EXAMPLE 2

A CMP slurry having a particle size distribution of about 50~300 nm and an average particle diameter of 145 nm was provided in the same manner as described in Example 1, except that the low-temperature calcination step was performed at 300° C. for 12 hours, and the high-temperature calcination step was performed at 800° C. for 2 hours.

EXAMPLE 3

A CMP slurry having a particle size distribution of about 50~300 nm and an average particle diameter of 160 nm was provided in the same manner as described in Example 1, except that the low-temperature calcination step was performed at 350° C. for 24 hours, and the high-temperature calcination step was performed at 850° C. for 2 hours.

EXAMPLE 4

A CMP slurry having a particle size distribution of about 50~300 nm and an average particle diameter of 130 nm was provided in the same manner as described in Example 1, except that the low-temperature calcination step was performed at 350° C. for 24 hours, and the high-temperature calcination step was performed at 900° C. for 2 hours.

EXAMPLE 5

A CMP slurry having a particle size distribution of about 50~300 nm and an average particle diameter of 155 nm was provided in the same manner as described in Example 1, except that the low-temperature calcination step was performed at 400° C. for 24 hours, and the high-temperature calcination step was performed at 950° C. for 2 hours.

EXAMPLE 6

A CMP slurry having a particle size distribution of about 50~300 nm and an average particle diameter of 140 nm was provided in the same manner as described in Example 1, except that the low-temperature calcination step was performed at 350° C. for 24 hours, and the high-temperature calcination step was performed at 1,000° C. for 2 hours.

COMPARATIVE EXAMPLE 1

A CMP slurry having a particle size distribution of about 50~300 nm and an average particle diameter of 145 nm was provided in the same manner as described in Example 1, except that the low-temperature calcination step and the pulverization step were not performed, and the high-temperature calcination step was performed at 850° C. for 2 hours.

COMPARATIVE EXAMPLE 2

A CMP slurry having a particle size distribution of about 50~300 nm and an average particle diameter of 125 nm was provided in the same manner as described in Example 1, except that the low-temperature calcination step and the pulverization step were not performed, and the high-temperature calcination step was performed at 950° C. for 2 hours.

Each of the one-component CMP slurry according to Examples 1~6 and Comparative Examples 1 and 2 was measured for polishing performance as follows. A Si substrate onto which $SiO_2$ was deposited by way of PECVD (plasma enhanced chemical vapor deposition) was attached to a head of a polishing system for CMP. Then, polishing was performed for one minute while each of the one-component CMP slurrys according to Examples 1~6 and Comparative Examples 1 and 2 was added dropwise to a polishing platen having a poly-urethane polishing pad attached thereto in an amount of 100 mL per minute for a period of one minute. At this time, the head was pressurized to the platen under a pressure of 280 g/cm$^2$, and each of the head and the platen was rotated at 90 rpm during the polishing. After carrying out the polishing, the substrate was washed thoroughly, and was measured for variations in thickness before and after the polishing by using a film thickness measuring system (Nanospec 6100, Nanometrics Co., USA). The results are shown in the following Table 1. Additionally, a silicon nitride layer obtained by LPCVD (low-pressure chemical vapor deposition) was polished in the same manner as described in the above with reference to the silicon oxide layer, and was measured for variations in thickness before and after the polishing by using the same system. The results are also shown in the following Table 1.

TABLE 1

| Item | low-temperature calcination | high-temperature calcination | Average particle diameter of cerium oxide powder (nm) | Polishing rate to silicon oxide layer (Å/min) | Polishing rate to silicon nitride layer (Å/min) | Selectivity |
|---|---|---|---|---|---|---|
| Ex. 1 | 250° C./6 hr. | 700° C./2 hr | 120 | 3207 | 145 | 22 |
| Ex. 2 | 300° C./12 hr | 800° C./2 hr | 145 | 3643 | 123 | 29 |
| Ex. 3 | 350° C./24 hr | 850° C./2 hr | 160 | 3821 | 116 | 33 |
| Ex. 4 | 350° C./24 hr | 900° C./2 hr | 130 | 3847 | 109 | 35 |
| Ex. 5 | 400° C./24 hr | 950° C./2 hr | 155 | 3926 | 118 | 33 |
| Ex. 6 | 350° C./24 hr | 1000° C./2 hr | 140 | 4209 | 121 | 35 |
| Comp. Ex. 1 | — | 850° C./2 hr | 145 | 3875 | 957 | 4 |
| Comp. Ex. 2 | — | 950° C./2 hr | 125 | 3627 | 879 | 4 |

As shown in Table 1, the CMP slurrys comprising the cerium oxide powder having a low strength and obtained via a low-temperature calcination step, a pulverization step and a high-temperature calcination step according to Examples 1~6 provides a high polishing selectivity of silicon oxide layer/silicon nitride layer of 20 or more even when using a small amount of dispersant is used in the absence of a separate additive. On the other hand, Comparative Examples 1 and 2 comprising cerium oxide obtained only by way of a firing step provides an increase polishing rate to a silicon nitride layer, resulting in a significant drop in polishing selectivity.

Meanwhile, each cerium oxide powder obtained from Examples 1~6 and Comparative Examples 1 and 2 was measured for specific surface area and pore fraction by using the BET method. The results are shown in the following Table 2.

TABLE 2

| Item | Specific surface area (m$^2$/g) | Pores <3 nm:pores ≧3 nm |
|---|---|---|
| Ex. 1 | 24.2 | 2.8:7.2 |
| Ex. 2 | 16.1 | 3.3:6.7 |
| Ex. 3 | 13.4 | 4.2:5.8 |
| Ex. 4 | 12.4 | 3.2:6.8 |
| Ex. 5 | 8.3 | 2.9:7.1 |
| Ex. 6 | 6.8 | 2.1:7.9 |
| Comp. Ex. 1 | 9.1 | 8.1:1.9 |
| Comp. Ex. 2 | 5.2 | 8.5:1.5 |

As shown in Table 2, the cerium oxide powder prepared by the method according to the present invention has a specific surface area of 5 m$^2$/g or more and a fraction of pores with a diameter of 3 nm or more of 20% or more (on the total pore volume basis). Additionally, as can be seen from Tables 1 and 2, the one-component CMP slurrys according to Examples 1~6, which comprise cerium oxide powder having a specific surface area of 5 m$^2$/g or more and a fraction of pores with a diameter of 3 nm or more of 20% or more (on the total pore volume basis), provide a polishing selectivity of silicon oxide layer/silicon nitride layer of 20 or more.

EXAMPLE 7

A CMP slurry having a particle size distribution of about 50~300 nm and an average particle diameter of 145 nm was provided in the same manner as described in Example 2, except that the dispersant, polyacrylic acid (Aldrich) was used in an amount of 5 g.

EXAMPLE 8

A CMP slurry having a particle size distribution of about 50~300 nm and an average particle diameter of 145 nm was provided in the same manner as described in Example 2, except that the dispersant, polyacrylic acid (Aldrich) was used in an amount of 40 g.

COMPARATIVE EXAMPLE 3

A CMP slurry having a particle size distribution of about 50~300 nm and an average particle diameter of 145 nm was provided in the same manner as described in Example 2, except that the dispersant, polyacrylic acid (Aldrich) was used in an amount of 1.5 g.

COMPARATIVE EXAMPLE 4

A CMP slurry having a particle size distribution of about 50~300 nm and an average particle diameter of 145 nm was provided in the same manner as described in Example 2, except that the dispersant, polyacrylic acid (Aldrich) was used in an amount of 60 g.

The one-component CMP slurrys according to Examples 7 and 8 and Comparative Examples 3 and 4 were determined for their polishing performance in the same manner as described above. The results are shown in the following Table 3.

TABLE 3

| Item | Cerium oxide content (g) | Polyacrylic acid (dispersant) content (g) | Average particle diameter of cerium oxide powder (nm) | Polishing rate to silicon oxide layer (Å/min) | Polishing rate to silicon nitride layer (Å/min) | Selectivity |
|---|---|---|---|---|---|---|
| Ex. 2 | 500 | 25 | 145 | 3643 | 123 | 29 |
| Ex. 7 | 500 | 5 | 145 | 3825 | 140 | 29 |
| Ex. 8 | 500 | 40 | 145 | 3374 | 116 | 33 |
| Comp. Ex. 3 | 500 | 1.5 | 145 | 4527 | 365 | 12 |
| Comp. Ex. 4 | 500 | 60 | 145 | 2926 | 283 | 10 |

As shown in Table 3, the CMP slurrys according to Examples 2, 7 and 8, which comprise the cerium oxide powder having a low strength and obtained via a low-temperature calcination step, a pulverization step and a high-temperature calcination step, and use 0.1~10 parts by weight of the dispersant based on 100 parts by weight of the cerium oxide powder, provide a high polishing selectivity of silicon oxide layer/silicon nitride layer of 20 or more. On the other hand, Comparative Example 3 using the dispersant in an amount less than 0.1 parts by weight provides an increased polishing rate to both a silicon oxide layer and a silicon nitride layer, resulting in a significant drop in polishing selectivity. Additionally, Comparative Example 4 using the dispersant in an amount greater than 10 parts by weight provides a decreased polishing rate to a silicon oxide layer and an increased polishing rate to a silicon nitride layer, resulting in a significant drop in polishing selectivity.

INDUSTRIAL APPLICABILITY

As can be seen from the foregoing, the CMP slurry according to the present invention uses, as an abrasive material, cerium oxide powder that is obtained via a low-temperature calcination step, optionally a pulverization step, and a high-temperature calcination step and has a high pore fraction and low strength. Thus, even if the CMP slurry is provided in the form of a one-component CMP slurry, there is no precipitation of the cerium oxide powder. Also, the one-component CMP slurry according to the present invention provides a sufficient polishing rate to a silicon oxide layer, and a significantly decreased polishing rate to a silicon nitride layer and an increased polishing selectivity of silicon oxide layer/silicon nitride layer, and shows uniform overall polishing quality. Particularly, the one-component CMP slurry according to the present invention provides a high polishing selectivity of silicon oxide layer/silicon nitride layer of 20:1 or more, even in the absence of a separate additive or an excessive amount (10 parts by weight or more based on 100 parts by weight of cerium oxide powder) of a dispersant. Further, the one-component CMP slurry according to the present invention minimizes generation of microscratch during a polishing process, and can provide an improved reliability and productivity when applied to a very large scale integrated semiconductor fabricating process requiring a fine pattern.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. Cerium oxide powder for one-component CMP slurry, which has a specific surface area of 5 $m^2/g$ or more, and a ratio of volume fraction of pores with a diameter of 3 nm or more to that of pores with a diameter less than 3 nm of 8:2~2:8.

2. The cerium oxide powder according to claim 1, which has a crystallite size of 10~60 nm.

3. The cerium oxide powder according to claim 1, which has an average particle diameter of 50 nm~1 μm and a largest particle size less than 3 μm.

4. The cerium oxide powder according to claim 1, which is used as an abrasive material for one-component CMP slurry having a polishing selectivity of silicon oxide layer/silicon nitride layer of 20:1 or more.

5. The cerium oxide powder according to claim 1, which shows an increased volume fraction of pores with a diameter of 3 nm or more, after polishing a silicon oxide ($SiO_2$) layer deposited on a Si substrate under a pressure of 100~400 $g/cm^2$ at a rotation speed of 50~150 rpm, the volume fraction being increased by 5 vol %~70 vol % as compared to a volume fraction of the pores before polishing.

6. The cerium oxide powder according to claim 1, which provides a polishing rate to silicon nitride layer of 20 Å/min~300 Å/min, when polishing silicon nitride ($Si_3N_4$) layer deposited on a Si substrate under a pressure of 100~400 g/cm2 at a rotation speed of 50~150 rpm.

7. A method for preparing the cerium oxide powder as defined in claim 1, the method comprising the steps of:
   (a) carrying out low-temperature calcination of cerium carbonate as a starting material at a temperature of 200~400° C. for 6~100 hours to obtain calcined cerium oxide powder;
   (b) pulverizing the calcined cerium oxide powder; and
   (c) carrying out high-temperature calcination of the pulverized calcined cerium oxide powder obtained from the preceding steps at a temperature of 600~1200° C. for 30 minutes~6 hours.

8. The method according to claim 7, wherein cerium carbonate comprises pore-forming material, which is decomposed in the low-temperature calcination step to form pores in cerium oxide.

9. The method according to claim 8, wherein the pore-forming material includes at least one material selected from the group consisting of aliphatic hydrocarbons, aromatic hydrocarbons, ether compounds, anhydride compounds, carbonate compounds, acrylic compounds, thioether compounds, isocyanate compounds, sulfone compounds, sulfate ion compounds, sulfoxide compounds, alkylene oxide polymers, acrylate polymers, methanol, ethanol, propanol, butanol, ethylene glycol, propylene glycol, acetone, glycerin, formic acid and ethyl acetate, which is an organic molecule or organic polymer capable of being thermally decomposed at a temperature of 450° C. or less, or an organic solvent having a dielectric constant of 10~80.

10. The method according to claim 7, wherein cerium carbonate has an average particle diameter of 0.1~20 μm.

11. The method according to claim 7, wherein the pulverization step is performed via a dry pulverization process selected from processes using a jet mill, a disc mill and a beads mill.

12. The method according to claim 7, wherein the pulverized cerium oxide powder has an average particle diameter of 0.3~2 μm after the pulverization step.

13. A one-component CMP slurry comprising an abrasive, a dispersant and water, wherein the abrasive comprises the cerium oxide powder as defined in claim 1.

14. The one-component CMP slurry according to claim 13, which has a polishing selectivity of silicon oxide layer/silicon nitride layer of 20:1 or more.

15. The one-component CMP slurry according to claim 13, which does not comprise an additive for improving a polishing selectivity of silicon oxide layer/silicon nitride layer.

16. The one-component CMP slurry according to claim 15, wherein the additive includes a polycarboxylic acid-based anionic polymer.

17. The one-component CMP slurry according to claim 13, which has a polishing rate to a silicon oxide layer of 3000 Å/min or more.

18. The one-component CMP slurry according to claim 13, wherein the dispersant is used in an amount of 0.5~10 parts by weight based on 100 parts by weight of the cerium oxide powder (solid content basis).

19. The one-component CMP slurry according to claim 13, wherein the dispersant is a nonionic polymer or an anionic polymer.

20. The one-component CMP slurry according to claim 13, wherein the dispersant is at least one material selected from the group consisting of polyvinyl alcohol, ethylene glycol, glycerin, polyethylene glycol, polypropylene glycol, polyvinyl pyrrolidone, polyacrylic acid, ammonium polyacrylate and polyacryl maleic acid.

21. The one-component CMP slurry according to claim 13, wherein the cerium oxide powder is used in an amount of 0.1~50 wt % based on the total weight of the slurry.

22. A method of shallow trench isolation comprising a polishing step using the one-component CMP slurry as defined in claim 13.

* * * * *